Feb. 2, 1960　　　　J. E. LOGAN ET AL　　　　2,923,438
AUTOMATIC PAINT MANUFACTURING MACHINE
Filed June 9, 1958　　　　　　　　　　　　　　13 Sheets-Sheet 1

INVENTORS
JAMES E. LOGAN
ARTHUR G. RUSSELL
GRANT N. WILLIS

BY　　　　　　　ATTORNEY

INVENTORS
JAMES E. LOGAN
ARTHUR G. RUSSELL
GRANT N. WILLIS
BY
ATTORNEY

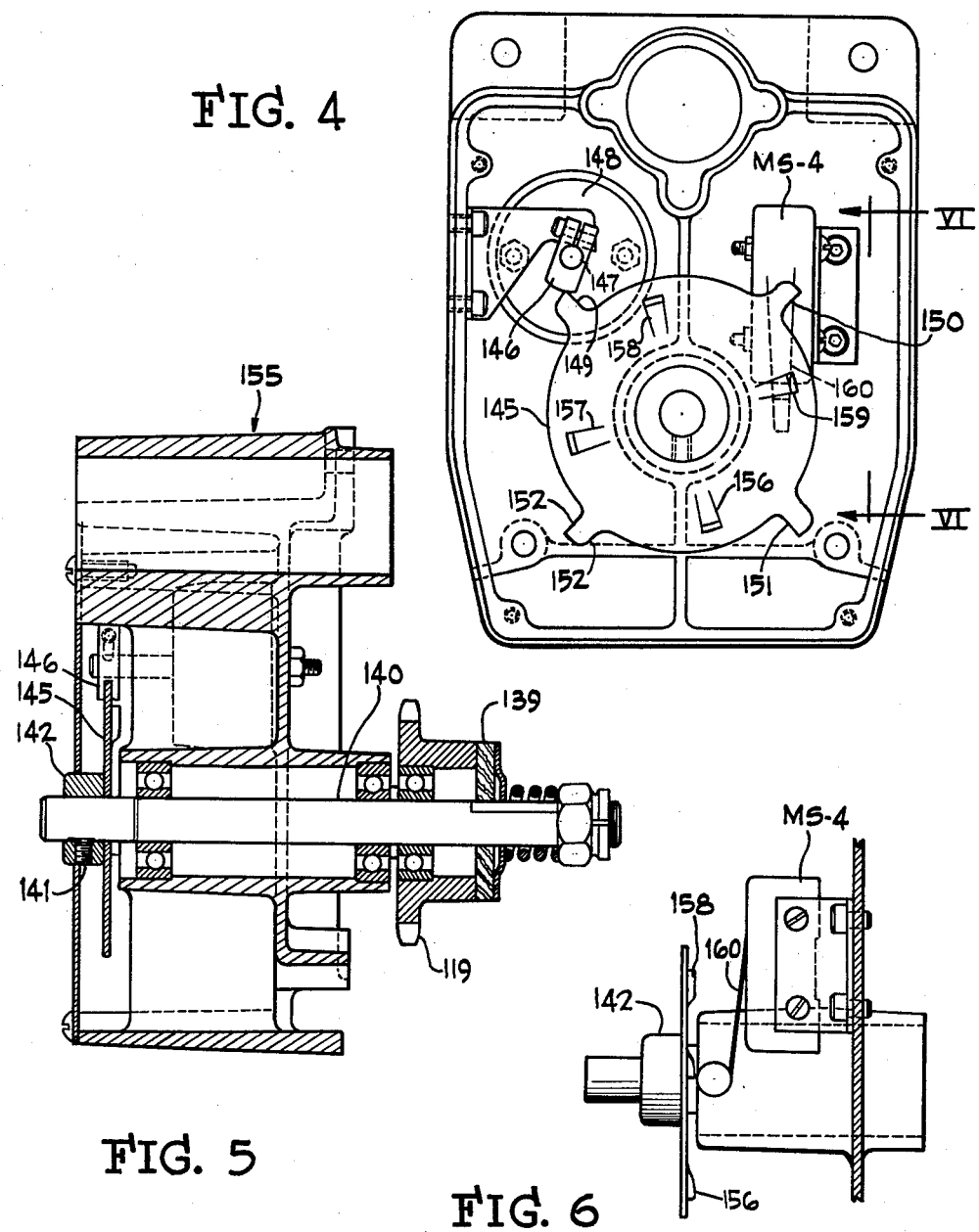

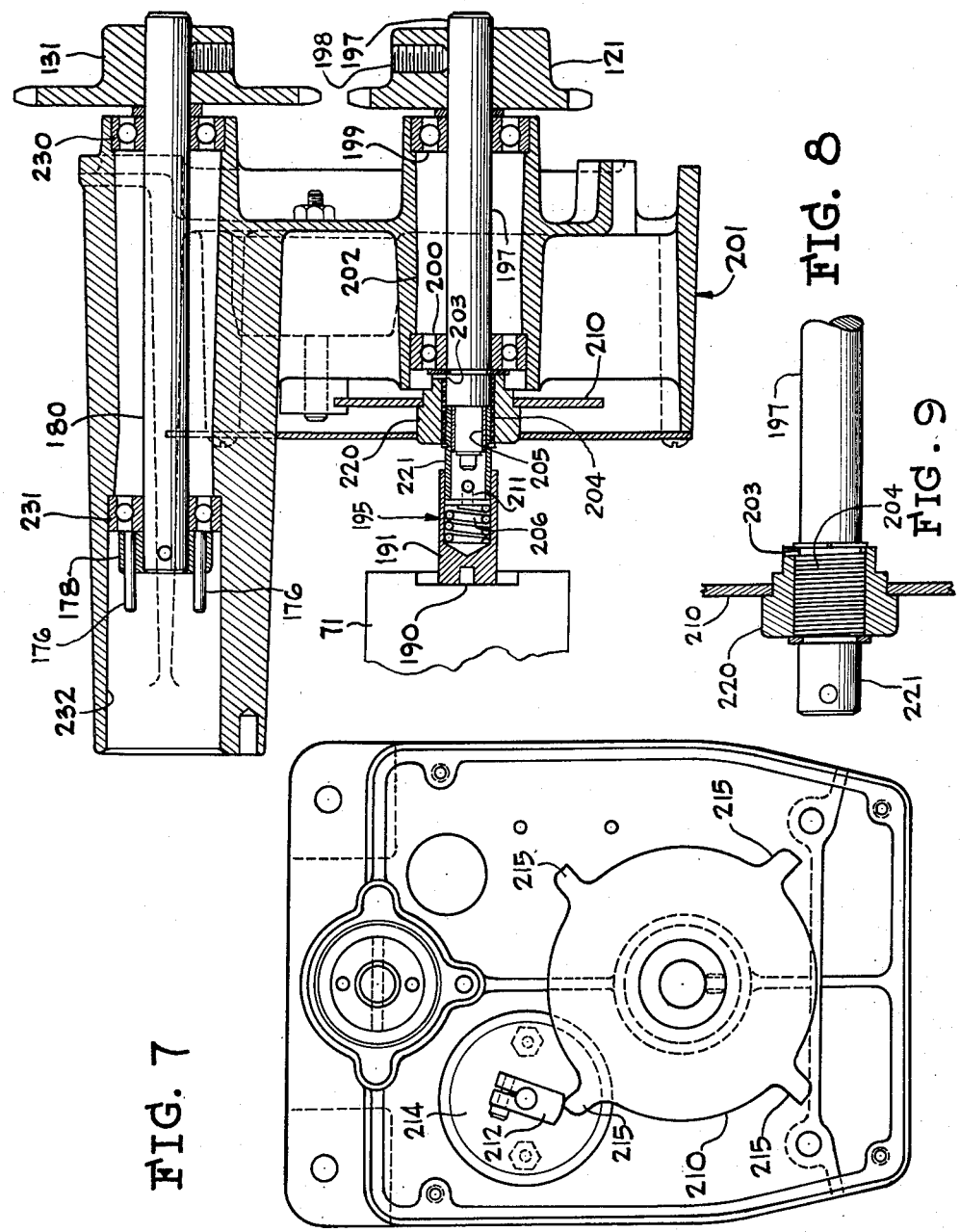

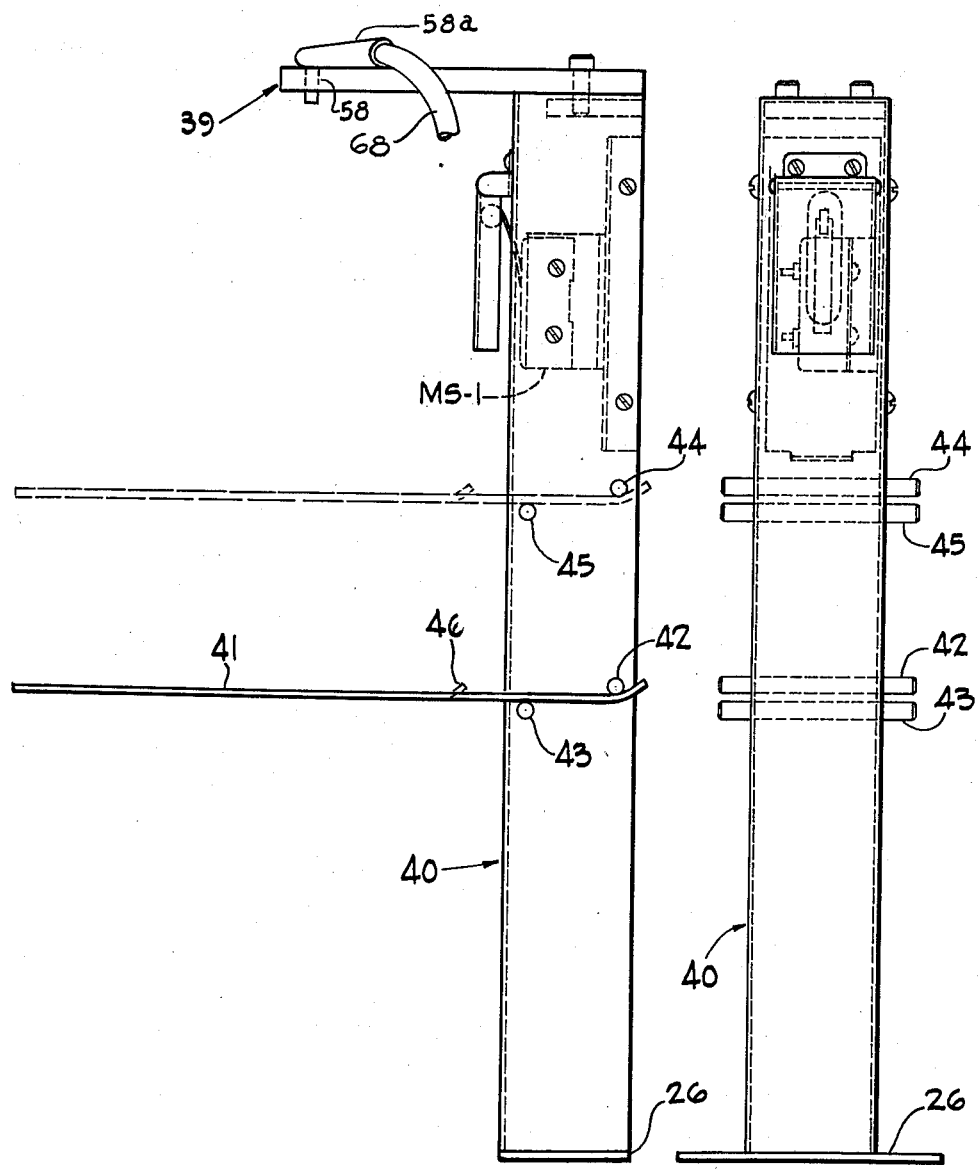

Feb. 2, 1960 J. E. LOGAN ET AL 2,923,438
AUTOMATIC PAINT MANUFACTURING MACHINE
Filed June 9, 1958 13 Sheets-Sheet 7

FIG. 12

INVENTORS
JAMES E. LOGAN
ARTHUR G. RUSSELL
GRANT N. WILLIS
BY
ATTORNEY

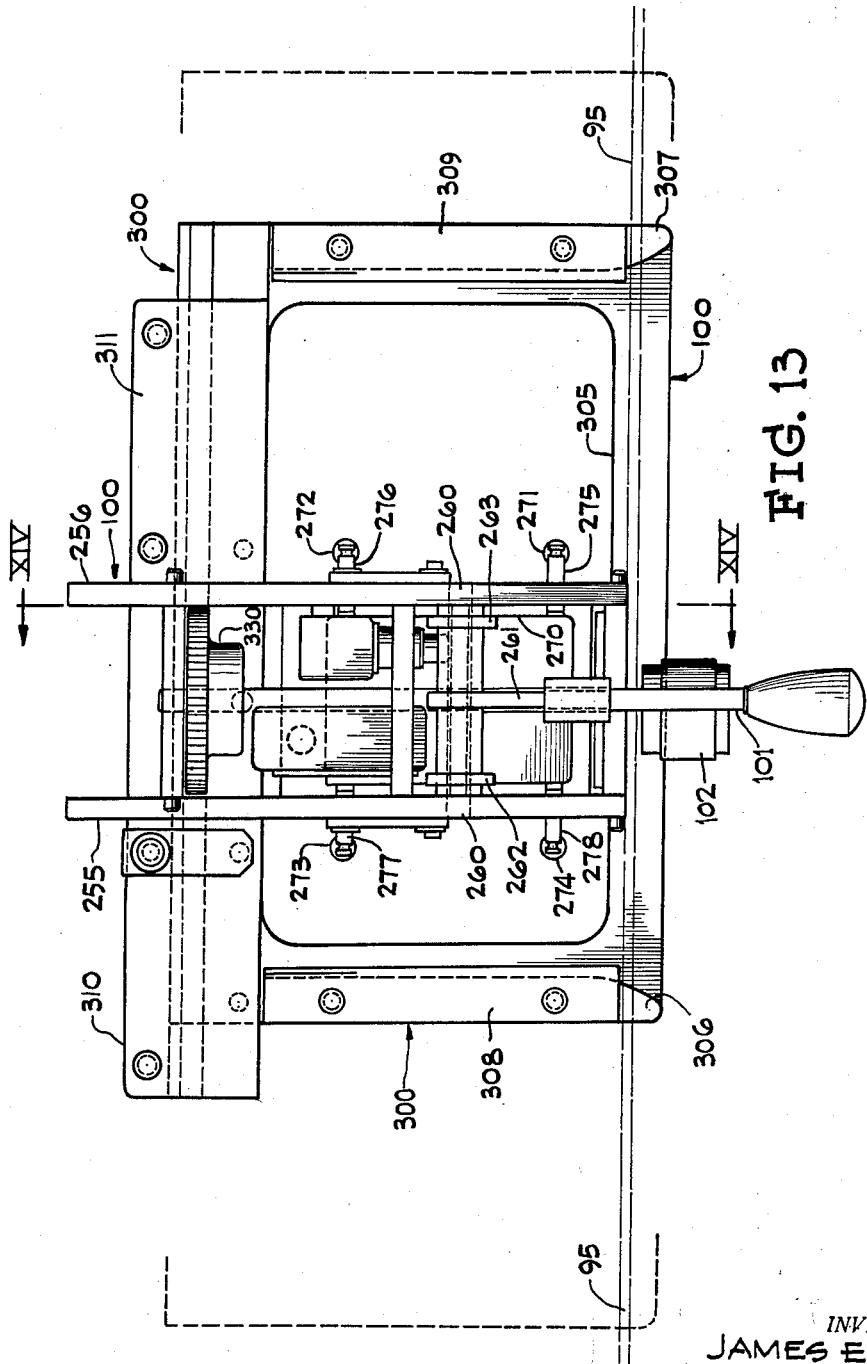

Feb. 2, 1960 J. E. LOGAN ET AL 2,923,438
AUTOMATIC PAINT MANUFACTURING MACHINE
Filed June 9, 1958 13 Sheets-Sheet 9
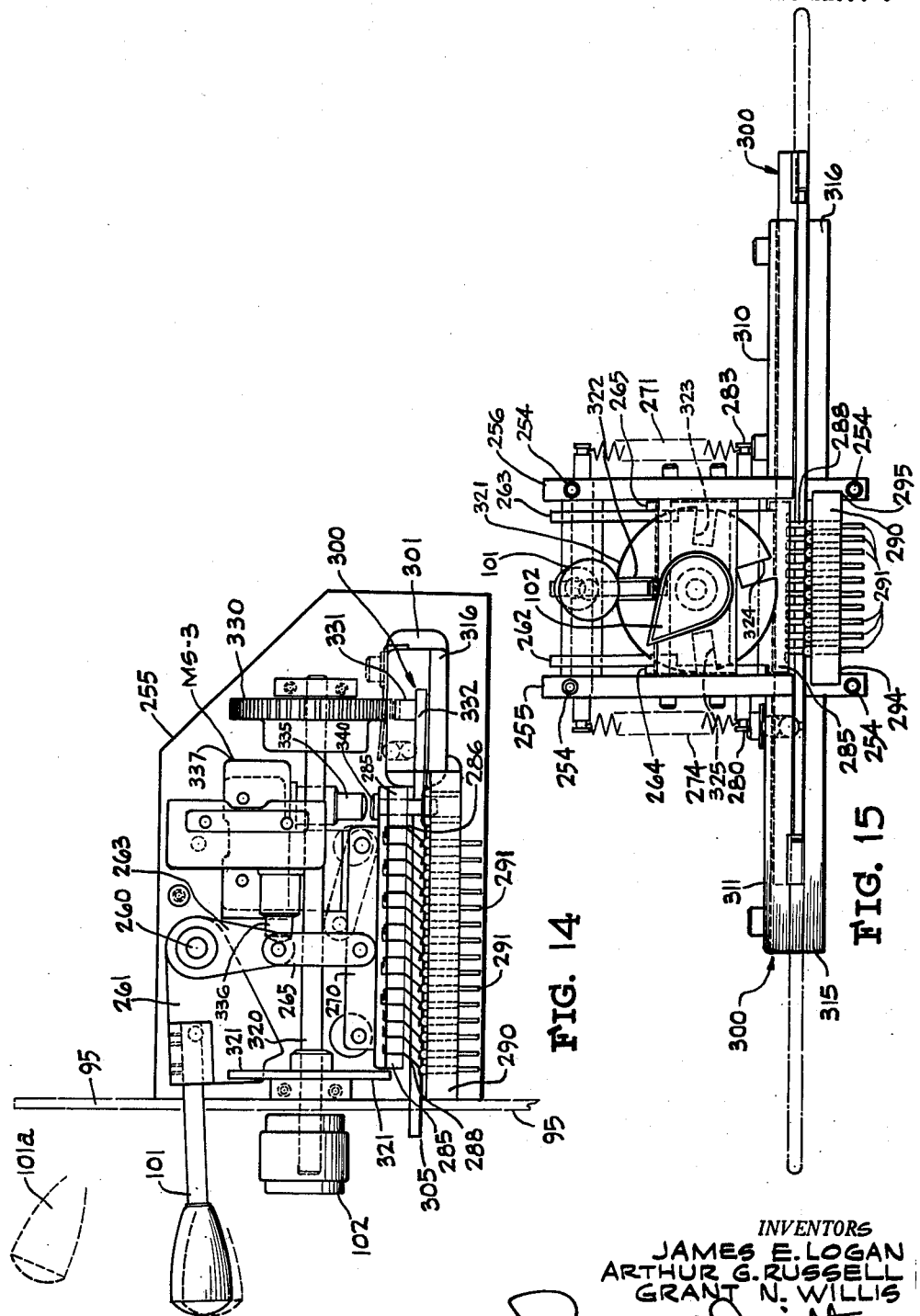
INVENTORS
JAMES E. LOGAN
ARTHUR G. RUSSELL
GRANT N. WILLIS
BY
ATTORNEY United States Patent Office 2,923,438
Patented Feb. 2, 1960

2,923,438
AUTOMATIC PAINT MANUFACTURING MACHINE

James E. Logan, Chicago, Ill., and Arthur G. Russell and Grant N. Willis, Bristol, Conn., assignors to The Martin Senour Company, Chicago, Ill., a corporation of Ohio Application June 9, 1958, Serial No. 740,740

8 Claims. (Cl. 222—2)

This invention relates to an automatic paint manufacturing machine which utilizes liquid bases to produce protective and decorative coating compositions of varying hue, value and chroma as well as varying specular reflection and quality.

More particularly this invention relates to a machine adapted to formulate paints of varying color, specular reflection and quality from a plurality of previously prepared and standardized liquid bases stored in a plurality of containers, a container for each liquid component, each container provided with means to maintain the liquid base in uniform condition, with means to transfer the liquid contained therein to a central point by a positive displacement pump associated with each container and with control means adapted to govern selected ones of said containers to deliver of their liquid base to the central point in pre-determined quantities through intelligence set up in said control means and fed by said control means to the base dispensing container units.

Specifically, this invention relates to a machine for the manufacture of liquid paint products which machine is directed to formulate one of a variety of potential paint products by feeding pre-determined information either manually or by a coded card into an information control center wherein the intelligence so set up in the control center is translated into pulses, each pulse of which is used to control the quantity of the selected liquid base to be delivered through electrical counting devices which in turn are controlled by additional information fed to the machine limiting the exent of the count in any selected number of a plurality of electrical pulse receiving circuits within the control of the information control center. Each pulse delivered corresponds to and controls a standard volumetric delivery from a positive displacement pump in association with liquid colorant storage vessels.

A principal object of this invention is to provide a paint making machine which will, from a remote control point, transfer intelligence from the control point to a dispensing center and the intelligence received at the dispensing center stimulating automatic formulation of a pre-determined quantity of paint product in a pre-determined quality, matching in color with a pre-determined standard defined by the said intelligence.

In one aspect, a principal object is to provide means for automating, at least in part, the manufacture of protective and decorative coatings in any pre-determined volume from laboratory to factory quantities.

In another aspect, the principal object of this invention is to provide a machine which will dispense on order a given quantity of a given quality of a paint product satisfying the need of the ultimate consumer and to provide him with custom colors matching any hue, value, chroma and reflectivity value he may specify.

These and other objects will become apparent as the nature of the new machine becomes apparent in the light of the following exposition when read and understood in conjunction with the following drawings which illustrate operative embodiments of the invention.

Referring in general to the drawings:

Figure 4 is an enlarged detailed view of the pulse generation and counting assembly as indicated in Figure 2;

Figure 5 is a side view, partially in section of the pulse generation and counting assembly of Figure 4;

Figure 6 is an enlarged partial view taken along the line VI—VI of Figure 4;

Figure 7 is a bottom view, similar to that of Figure 2, but enlarged to illustrate detail of the means adapted to receive and operate the unit shown in Figure 3;

Figure 8 is an enlarged view partially in section centrally through the means illustrated in Figure 7;

Figure 9 is an enlarged detail, partly in section and with parts broken away, of the spring clutch mechanism indicated in Figure 8;

Figure 10 is an enlarged side view of the container receiving support centered in Figure 1;

Figure 11 is a front view of Figure 10;

Figure 12 is an enlarged view of the punch card used in the punch card modification of the invention;

Figure 13 is a top view of the card reader assembly used in the punch card modification of the invention;

Figure 14 is a side view of the assembly shown in Figure 13 generally along line XIV—XIV;

Figure 15 is a front view of the card reader of Figure 13 with the front control panel removed;

Figure 1:
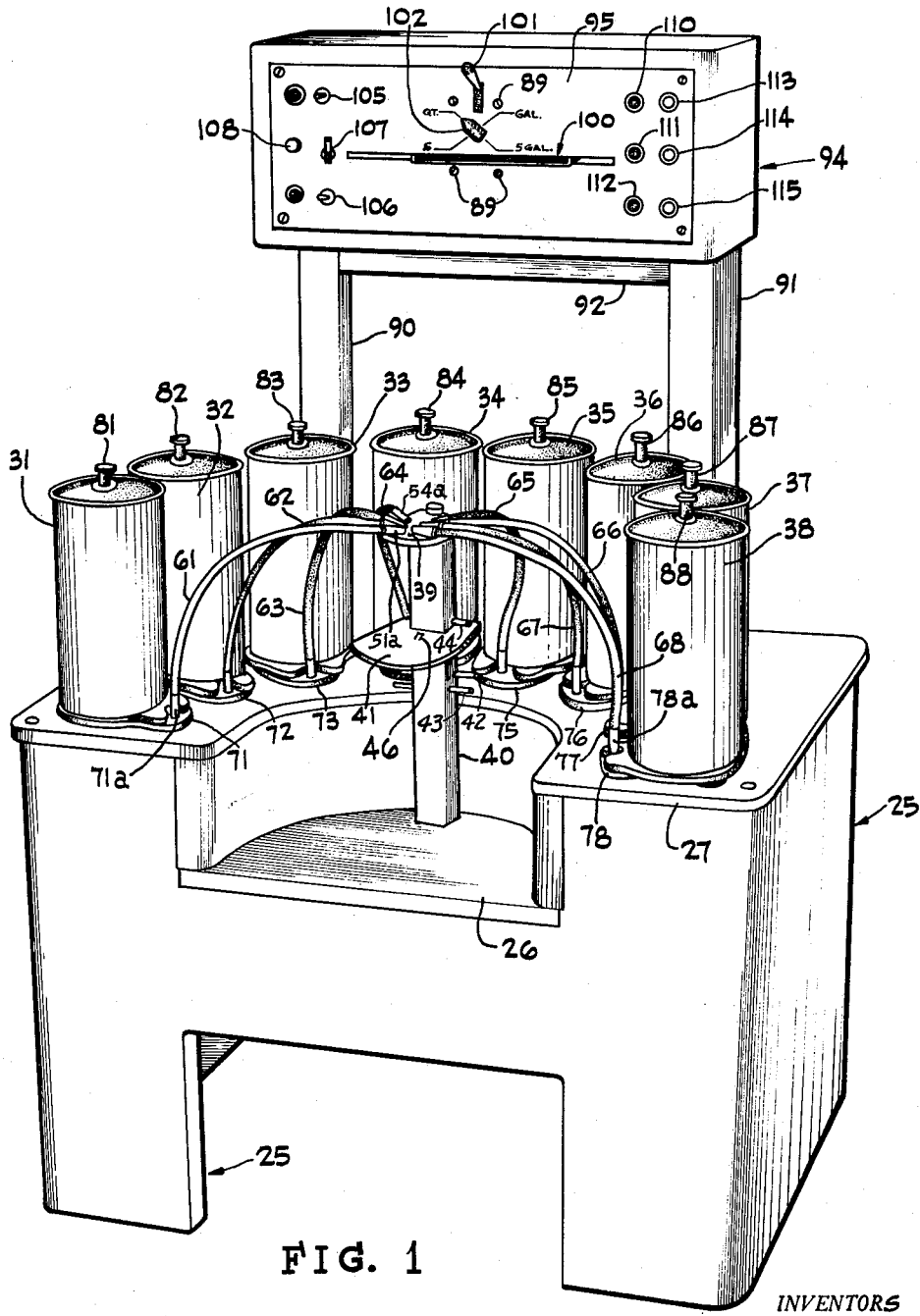
Figure 1 is a front view in perspective of one embodiment of the invention in final assembly.

Referring more particularly to the drawings, starting with Figure 1; a wrap-around cabinet 25 provides support for dispensing table 26 and equipment supporting plate 27 above which the liquid paint base storage containers 31 to 38 are mounted. Rearwardly and to the center of dispensing table 26 is a vertical supporting member 40 which provides supporting means for the adjustable and removable plate 41 which is adapted to slip between the pins 42 and 43 and 44 and 45 (see also Figures 10 and 11). Centrally in plate 41 is detent 46 adapted to catch under the lower bead of a container. Topping support 40 is a second, but fixed, horizontal plate 39 drilled about its forward periphery with holes 51 to 58 adapted to receive corresponding nozzles 51a to 58a which are the terminal outlets for corresponding delivery tubes 61 to 68 leading from the outlets 71a to 78a of pumps 71 to 78.

In the adaptation of this invention described and illustrated herein it will be noted that all valve systems have been dispensed with. This has been made possible by controlling the diameter of the exit orifices of nozzles 51a to 58a to a diameter such that at the terminus of each quantum of delivery of liquid from the containers 31 to 38 by positive displacement gear pumps 71 to 78 the capillary forces are such as to prevent drip of the liquid from the tip of the nozzles 51a to 58a.

Each of the containers is fitted with a cover 81 to 88 which may be of transparent material to permit vision within the container to view the level of the liquid content thereof. In more complex modifications level control systems are contemplated along with remotely controlled terminus nozzle valves.

Rearwardly of the wrap-around cabinet are two hollow vertical posts or columns 90 and 91 held at a fixed distance apart by horizontal support 92. The control box 94 is rigidly maintained in its spaced relation from cabinet 25 by the supporting framework provided by columns 90 and 91 and the horizontal support 92 in assembly.

Access to control box 94 is provided by means of control panel 95 to which may be rearwardly attached a supporting chassis 97 upon which the mechanisms and apparatus essential to the electrical circuits may be mounted.

The modification illustrated in Figure 1 details control panel 95 of the punch card modification indicating the card reader 100 and the various circuit indicating lamps and switches which may form a part of the electrical system.

Control lever 101 provides a means of clamping a punched card in the card reader 100, and the card reader positioning knob 102 provides means for shifting the punched card in card reader 100. Switches 105 and 106 provide means for control of the 115 volt and 24 volt power supplies. Starting button 107 (also referred to in the electrical diagrams as starter button SB) and reset button 108 or RB in the schematic provide means for starting the unit to dispense in the first case and to return all switch contacts to a starting position in the second case. Indicator lamps 110 through 115 may be wired into the various circuits to show operation of the circuit or to indicate the source of failure in certain aspects of circuit operation. Uses will be obvious to those familiar with indicator lamps.

Figure 2:
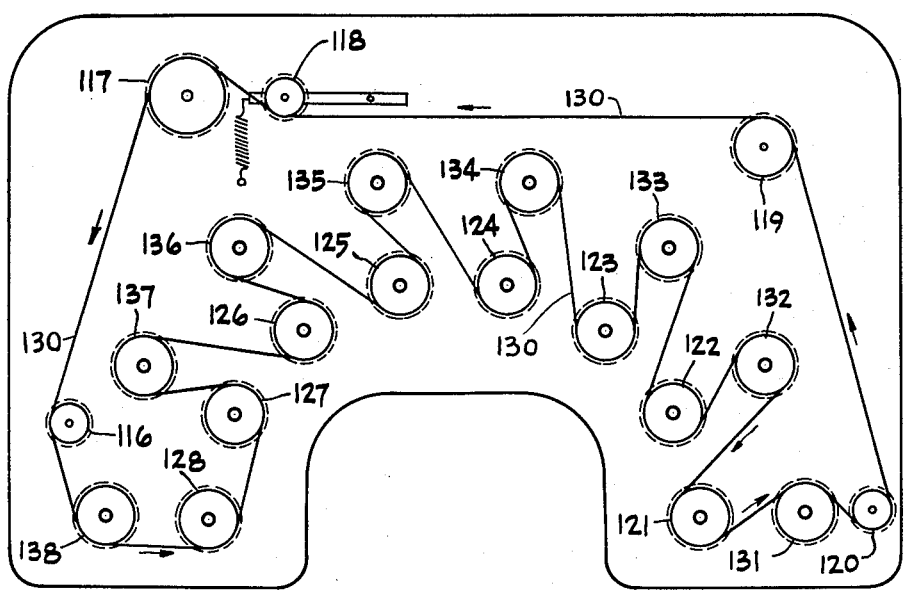
Figure 2 is a diagrammatic bottom view of the assembled embodiment of Figure 1.

Looking upwards underneath the machine within the periphery of the cabinet 25, as in Figure 2, one observes pump drive sprockets 121 through 128 and the agitator drive sprockets 131 through 138 around which sprockets the endless drive chain 130 passes from the motor drive sprocket 117, chain take-up idler 118, fixed position sprockets 119, 120 and 116 back to the motor drive sprockets 117.

Fixed position sprocket 119 is used to drive clutch 139 which in turn causes the timer shaft 140 (Fig. 5) to be rotated. Keyed to shaft 140 by set-screw 141 in collar 142 is the pulse generator and counter wheel 145 integrated with collar 142.

When the machine is first energized and motor gear or sprocket 117 first drives chain 130 rotating all the individual sprockets shown in Figure 2, shaft 140 is not rotated, but is held from rotation by stop pawl 146 mounted on solenoid 148 shaft 147. This is the normal position of stop pawl 146 when it blocks against one of the peripheral teeth 149, 150, 151 or 152 equally spaced about pulse generator and counter wheel 145. When the timing control solenoid 148 is energized, stop pawl 146 is moved outward releasing pulse wheel 145 which is immediately rotated through sprocket 119, clutch 139 and shaft 140 of pulse timer assembly 155 of Figure 5.

Rotation of pulse generator and counter wheel 145 causes the four equally spaced downwardly depending radial dimples 156, 157, 158 and 159 to contact and flex arm 160 of microswitch MS-4. Deflection of MS-4 generates one pulse for each quarter turn of timer shaft 140. As sprockets 119 and all the pump drive sprockets 121 to 128 are of the same dimensions and driven at a standard rate by chain 130, it follows that for each quarter revolution of any one of the positive displacement gear pumps 71 to 78, one pulse is generated. Thus, a count of the pulses generated under a specific set of conditions counts the volumes delivered by each quarter revolution of the positive displacement pumps 71 through 78 or of those in that group of pumps which might be conditioned to function.

Figure 3:
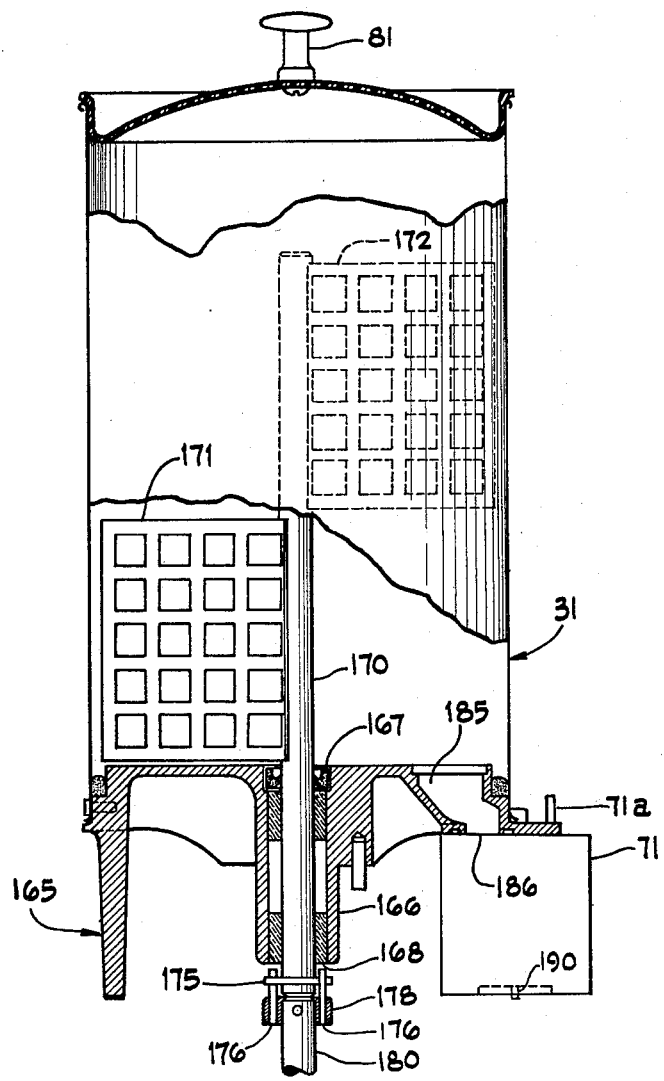
Figure 3 is an enlarged view, with parts broken away and partly in section, of one of the container units removed from the assembly of Figure 1.

Container 31 and the containers 32 through 38 are exact duplicates in the illustrative embodiment here described. Each container with its associated pump may be individually removed in assembly. Referring to Figure 3, container 31 is essentially a cylindrical shell adapted at its top to receive cover 81 and at its base to fit snugly about special casting 165 which is essentially circular in plan and adapted centrally with a substantial vertical journal 166, packed to provide seals 167 and 168 at either end about the vertical upper agitator shaft 170 which extends upwardly into container 31 and to which are affixed agitator blades 171 and 172. Shaft 170 is diametrically drilled and fitted at its lower end with horizontal pin 175 which is adapted to engage vertical pins 176 in collar 178 keyed to lower agitator shaft 180.

Positive displacement pump 71 is attached to the circular casting 165 about an egress opening 185 from the bottom of container 31 into the intake opening 186 of gear pump 71 (illustrative of pumps 71 to 78).

The bottom of pump 71 is adapted to receive pump drive shaft 190 through its disconnecting shaft coupling. Thus rotation of the pump drive shaft 190 through each one quarter revolution causes delivery through orifice 71a of one reproducible volume of the liquid stored in container 31. If something should fail to operate correctly in any one of the unit containers 31, the entire unit consisting of pump 71, container 31 agitator 170 and casting 165 can be removed and replaced with a similar unit in but a moment's time. Interchangeability of the elements detailed in Figure 3 in any one of the eight container receptacles in table 27 has many obvious advantages including economy, convenience, cost, reproducibility of result and a minimum of surplus parts inventory.

Referring to Figures 7, 8 and 9 one finds illustrated a single one of the drive mechanisms illustrated in plural number and complete assembly in Figure 2. The sectional portion of Figure 8 details the parts which cooperatively engage with the sectional portion of Figure 3.

It will be apparent on examining the drawings that the bottom portion illustrated in Figure 3, when oriented through 180 degrees, is adapted to fit over, rest upon and engage operative portions of the drive mechanism illustrated in Figure 8. Identical numbers identify identical parts.

Referring particularly to Figure 8 it will be apparent that pump shaft 190 of pump 71 is engaged by a disconnecting upper pump shaft adapter coupling 191 which provides an outer housing for the spring clutch 195 shown in greater detail in Figure 9. Sprocket 121 driven by chain 130 and motor drive gear 117 is keyed to lower pump shaft 197 by Allen screw 198. Shaft 197 rotates in bearing races 199 and 200 in journal 202 of drive housing casting 201. A similar casting is used in the eight container, pump and drive mechanisms of the modification of the invention shown. The casting is also used when cut off to make the timer and pulse generator housing 155 of Figure 5.

Top bushing 205 to lower pump drive shaft 197 rotates within drive shaft adapter 221. Drive shaft adapter 221 and the remainder of pump drive shaft 197 are of the same diameter. Under normal conditions the pump stop wheel 210, of similar construction to pulse generator and counting wheel 145, is restrained from rotation by solenoid stop pawl 212 which engages pulse counting wheel 210 tooth 215. Pump stop wheel 210 is arrested in rotation when solenoid 214 is deenergized. Upon energizing solenoid 214, stop pawl 212 is rotated out of the path of teeth 215 and the upper pump shaft 190 is then rotated by engagement of the wire clutch assembly 195.

By comparison of Figures 7 and 8 with Figures 4 and 5, one can see the parallel and similar nature of the sprocket driven units illustrated. In Figures 4 and 5 a pulse source is generated for each quarter turn of the pulse generator and counting wheel 145 when it is released to rotate through energizing of its controlling solenoid 148. In Figures 7 and 8, upper pump drive shaft 190 is prevented from rotation unless its solenoid 214 is energized. Through the electrical circuits, to be described, the pulse generator and counting wheel 145 is in operation as long as the machine is formulating a paint. However, the positive displacement pump or pumps 71 to 78 operated by upper pump shafts 190 are selectively controlled through their corresponding solenoids 214 and may or may not be in operation at the same time. By activation of their controlling solenoids 214 the speed for rotation of the pulse counting unit and the pump liquid volume delivery unit is identical, both being driven by common motor sprocket 117 and drive chain 130.

Operation of spring clutch 195 is detailed in Figure 9. Under normal conditions pump counting wheel 210 is restrained by stop pawl 212. Under these conditions, clutch spring 204 tends to be loosened about the lower half of shaft adapter 221 and the upper portion of shaft 197, that is, a portion having the same diameter as shaft adapter 221. As stop pawl 212 releases upon energizing solenoid 214, pump counting wheel 210 begins to turn. This is due to spring 204 tending to tighten about and around drive shaft adapter 221 and drive shaft 197. An outwardly bent lower tip of spring 204 is adapted to slip into diametrical slot 203 of hub 220. When wheel 210 is prevented from rotation the engagement of slot 203 and the corresponding spring 204 tip tends to loosen spring 204. However, when pawl 212 is withdrawn spring 204, tightened by the load of the pump 71 and wheel 210 acting upon the spring 204 tip in slot 203, grasps both pump shaft adapter 221 and shaft 197. Due to the very close tolerances of spring 204 about the two elements this action is immediate. Pump adapter 221, pinned to pump shaft coupling 191 in slot 211 in adapter 221, drives coupling 191 and pump 71 shaft 190. The greater the load the tighter the spring 204 becomes. (It is understood that a similar spring clutch is employed in operation of the dial of a dial telephone where direction of rotation of the dial either seizes or releases the dial shaft.) When solenoid 214 is deenergized, stop pawl 212 again blocks one of the teeth 215 and spring 204 tends to expand in diameter, is immediately loosened about drive shaft adapter 221 and shaft 197 which allows shaft 197 to continue to rotate until the main circuit is broken without operating the pumps.

Sprocket gear 131, driven by chain 130 continuously drives lower agitator shaft 180 in appropriate bearing races 230 and 231 set in the vertical shaft guide 232. This action, transferred to agitators 171 and 172 of upper agitator shaft 170 assures intimate admixture and color uniformity of each of the liquids within containers 31—38.

Figures 10 and 11 indicate detail of the central container support 40. It will be observed that horizontal pins 42 and 43 provide support for plate 41 and that the plate may be removed easily and quickly replaced and held in another position by a similar set of pins 44 and 45. Central horizontal nozzle plate 39 has eight holes drilled vertically through its forward edge in a semicircular pattern and these holes are adapted to receive dispensing nozzles 51a through 58a whose orifice diameters are such that the liquid is held within the nozzle as soon as the pressure on the liquid in the connecting tubes 61 through 68 has been relieved by stoppage of the pump action as previously described.

Microswitch MS-1 is adapted to be closed when a receiving container is placed in the proper position below delivery nozzle plate 39.

While positive displacement mechanically activated gear pumps are here illustrated and preferred, a modification has been reduced to practice utilizing a pump operated by a solenoid having a ball check valve at the ingress and egress parts of the pump cylinder. As the particular check valves interfered with accuracy, the gear pump provides more readily adaptable and maintenace free operation.

In the mechanical aspects of the invention thus far described have been provided means for electrical pulse generation having direct relation with volume of liquid dispensation from positive displacement pumps. Means have been provided for agitation of a plurality of containers of liquids and means to move the so-maintained liquids to a central control point for delivery of the liquids to a single receiving vessel. The foregoing describes the principal mechanical features and the following is directed primarily to the selection and control devices which are co-related to the preceding, primarily by electro-mechanical means.

In the preferred modification of the invention, the electrical controls are primarily established by a punch card, the arrangement of which is set forward as follows:

*The key punch card*

In the preferred operation of the machine, an insulative card, illustrated in Figure 12, which conveniently may be of the exact color of the paint to be dispensed and which is conveniently of five inch by eight inch size, is used to receive the coded intelligence essential to set up the requisite circuits to deliver the exact quantity of the exact quality of base color required to produce a standard predetermined bulk of completed coating composition.

For present purposes of illustration, the card itself is divided into four master columns which are vertically aligned beneath large master index holes 250, 251, 252 and 253 at the top of the card. Each of these master columns are adapted to function entirely independently of one another when the card is in place in the card reader 100. Reading from left to right the first master column is for specials "S," the second for quarts "Q," the third for gallons "G," and the last master column is for five gallon lots "5G." Each master column contains ten vertically aligned spaces to make ten single vertical columns under each index hole and in each master column. There are fifteen rows in each column, evenly spaced, one below the other. These are combined in three major rows of four and one major row of three. The master columns under the index holes are related through their numeral values in this wise: The number represented in master column in the first three major rows for the gallons G is one fourth the number for quarts and five times the number for five gallons—as is obvious upon consideration and as can be seen from a study of the function of the key punched cards as the manner of its operation is understood more completely. In other words, one quart would require one fourth the amount of a particular color to make a standard color than would one gallon. In turn, 5 gallons would require five times the amount of that color as would the single gallon.

In use of the punched card in actual operation, setting of the punch card reader selector 100 moves the card by means of a rack and pinion mechanism, hereinafter described, so that the particular operative master column, illustratively "G," for a given setting of the punch card reader 100 is moved into a circuit-checked operative contact position. Safety circuits, as will be seen, provide contacts in series which prevent machine operation unless the key punched card is correctly positioned.

Directing attention to the particular master column "G," the three major rows of four single rows each are to be observed. The three major sets of four rows each are generally labeled, A, B, and C and are identical in layout and in function independent of the index position and may be referred to as digital block A, digital block B and digital block C. These digital blocks are correlated to circuits generally identified as A, B and C. Immediately below the major digital rows of blocks are three single rows (one unit in depth), each identified by capital letters A1, B1 and C1. These rows in turn are correlated by the same identifying letters A, B and C—indicating a relationship to the digital blocks and are sometimes herein referred to as pump selector rows as they control pump selection in circuits A, B and C. Pump selector row A1 allows for selection of any one of eight pump units within the A circuit to be controlled through digital block A; pump selector row B1 and C1 act in comparative and similar manner through their corresponding digital blocks B and C to control units of volume to be delivered by the selected pump in the correspondingly identified circuits.

Examining digital block A more closely, it will be observed that the first single row through the fourth row contains a series of consecutively numbered individual spaces which are identified in sequence to zero and the numbers one through nine. The fourth, or lowest row, corresponds to units or sometimes U; the third, or next to the lowest, to tens (T); the second, to hundreds (H); and the first row to thousands (M). Digital blocks B and C are likewise organized. Throughout the discussion of the automatic card model the letters A, B and C relate to circuits through these areas of the punched card when the punched card circuitry is intended. To illustrate, assume it is wished to key the card to deliver 1234 units of liquid or colorant from pump 1, 5678 units of liquid or colorant from pump 5 and 9012 units of liquid or colorant from pump 7. Holes are punched in the "c" and 1 position in pump selector row A1, "c" and 5 position in pump selector row B1, and "c" and 7 positions in pump selector row C1. A potential pump circuit selection is made thereby.

Correlatively, in digital block A under index "G," the thousands row M would be punched out through the number 1, the hundreds row H through number 2, the tens row T through 3 and the units row U through 1. Similarly, digital block B would be punched out to read 5678 and digital block C punched to read 9012. In those cases where any digital row is not to be used, the zero position is punched out. This only provides means to complete circuitry necessary to complete operation when the card is in use in the Card Reader.

It should be recognized that this paint making machine was first developed and used to control but three pumps at a time to deliver three of eight available qualities of liquids and is but a beginning. It is contemplated and within the scope of this invention to develop an entirely automated paint plant where a relatively large number of supply vessels are held within maximum and minimum tolerance liquid levels as liquids and liquid colorants are withdrawn from pre-selected vessels. Likewise, selectivity of of any pre-determined group of operative pumps out of a hundred or more storage vessels can be accomplished by multiplication of the equipment. The invention as here illustrated and described is concerned with providing custom colors at the will of the operator.

Thus, it is contemplated that repeatedly made paint formulae will be reduced to punched cards which are stored pending requisition of particular quality and color of paint product. Upon receipt of order receipt of order the paint plant is fed the punched card and the special product will be provided by pipe lines to the completed goods filling room. Automatic equipment available there completes the packaging, labeling, packing and shipment for delivery. It is also contemplated that the electro-mechanical counting mechanisms herein used may be supplanted with purely electronic counters as are presently commercially available, but in the present machine where electronic speeds are unnecessary, have not been selected for use for purely practical reasons.

*The punched card reader*

The drawings illustrating card reader 100 contained within control box 94 are principally Figures 13, 14 and 15.

The card reader 100 is held by and mounted upon the control box 94 front panel 95 by four cap screws 89 which enter the forward edges of left side plate 255 and right side plate 256 in tapped holes 254 to which and from which the functional parts of card reader 100 are attached and suspended. A first pin shaft 260 fixing the distance between left side plate 255 and right side plate 256 provides pivotal support for closing lever 101, the clamp control handle which extends forwardly from front control panel 95. Control handle 101 is rigidly attached to vertical adapter plate 261 which in turn is integral with left and right hand closing lever end pieces 262 and 263. Closing lever end pieces 262 and 263 pivot about first pin shaft 260. Each of the closing lever end pieces 262 and 263 is pivotally attached to closing links 264 and 265 which provide a positive knee-like flexible connection with upper movable control contact carrier block 270.

As the closing lever 101 is raised from the position shown to the dotted position 101a, closing lever end pieces 262 and 263 bring the upper end of the control links 264 and 265 slightly forward (towards control panel) and then upwards. Movement and stability of mounting of the upper movable control contact carrier block is provided by four tension springs 271, 272, 273, and 274 attached upwardly from pins 275, 276, 277 and 278 extending outtwardly from side plates 255 and 256. The other ends of the tension springs are attached to corresponding pins 280, 281, 282 and 283 set in outside edges of upper carrier block 270.

The upper electrical contact finger control block 285 is bolted to the upper carrier block 270. The electrical contact finger control block 285 is fabricated from a rectangular block of insulating material by saw cutting fifteen slots 286 normal to the longitudinal axis of a rectangular insulating plastic block. Thin, spring like sheets of berylium copper metal are stamped to form the strip contacts 288, the individual contacts of which are bent as shown, silver plated, and assembled in the rectangular plastic block in the manner illustrated in Figure 14. A corresponding lower, but fixed, electrical contact control block of similar size and material 290 is of a similar plastic and fabricated so that there are ten columns of fifteen holes per column drilled in uniform spatial arrangement in the lower, fixed, contact block 290. Each hole so drilled is fitted with a rounded head metal contact tube, the opposite or lower end of which is hollow to accept electrical conductors which connect each of the rounded headed hollow contacts 291 thereof in lower contact block 290. Each of the round headed contacts 291 are wired to the appropriate and corresponding contact of the various banks of the digital stepping switches which count pulses generated by wheel 145. The particular bank of the stepping switch and the particular stepping switch selected will then correspond with the punched card and with the pump circuits A1, B1 and C1 as well as the major control blocks governing the digital numbers corresponding to units, tens, hundreds and thousands in the circuits referred to generally as A, B and C.

The lower fixed contact block 290 is adapted to slide into chamfered slots 294 and 295 in side plates 255 and 256.

To accommodate card reader 100 to the various alternative areas of the punched cards corresponding, in the specific machine illustrated, to delivery of a special total, namely; S, 1 quart, 1 gallon and 5 gallons of material; a movable carriage 360 is assembled and supported within horizontal slot 301 in side plates 255 and 256.

The movable carriage 300 is assembled in a sandwich arrangement by mounting parts both above and below card holder plate 305 which is cut out centrally to accommodate the punched card. Eighteen gauge stainless steel stock is useful for this purpose. Above holder plate 305 and on each outward end are card holder guides and spacers 306 and 307. Superimposed above the guides 306 and 307 are card holder top plates 308 and 309 which serve to position and hold the card in accurate alignment in place and within the movable carriage 300. Rearwardly above and across the back of the movable card holder 300 plate 305 are card holder guides 310 and 311 beneath which the card holder 300 can be moved from one side to another by a rack and pinion gear. Bottom slide support bars 315 and 316 beneath 310 and 311 also extend horizontally across the rear extremes of the card reader and are adapted to provide support means for movable card holder 300.

Movement of the punched card in place in the card reader to the appropriate section of the card is accomplished by moving the movable card holder 300. This is initiated by card reader positioning knob 102 mounted forwardly of control panel 95 on horizontal shaft 320 normal to panel 95, being turned to the wanted position. Mounted immediately behind control panel 95 and on the same shaft 320 is more or less radially slotted disk referred to herein as station interlock 321. Each of the radial slots 322, 323, 324 and 325 control and set the position of the movable carriage 300 and firmly fix the punched card in a predetermined position within and between electrical contact blocks 285 and 290. At and on the opposite end of horizontal shaft 320 from the control knob 102 is mounted pinion gear 330 which is adapted to move movable carriage 300 to the left or right through meshing of the gear with horizontal rack 331 supported above and fastened to the rear bottom bar 332 above the card cut out plate 305 and attached thereto to form a rear stop for an inserted punched card.

In operation, closing lever 101 is raised to position 101a. The punched card is inserted. Card reader positioning control knob 102 may be turned to move the movable carriage 300 to the desired position as indicated on the control panel by sliding carriage 300 horizontally between the slots 301 in the side plates 255 and 256. After close approximation of the correct position, closing lever 101 is brought downward, causing adapter plate 261 integral with lever 101 to slide into the selected slot 322 in station interlock 321. Thus, further motion of the punched card in relation to the electrical contact blocks 285 and 290 is prevented. Electrical contacts 288 then contact fixed electrical contacts 291 through holes in the punched card setting up particular potential circuits.

Presuming the presence of a punched card in card reader 300 and closing lever 101 closed, or downwardly positioned, two safety conditions precedent to operation are met through electrical switch contacts 335 and 336 of electrical switch 337 which contacts, by means of pressure of closing lever end piece 265 contacting the spring loaded pin contact 336 of switch 337.

A second electrical condition essential to electrical operation is met when one of the large index holes 252 of the punched card (Figure 12) is aligned with the vertical card correct pin 340 of electrical switch 337. This latter condition occurs when card correct pin 340 drops through index hole 252 of the punched card.

As can be seen, a punched card may be positioned in the card reader while closing lever 101 is elevated to position 101a. Upon depressing the closing lever 101 the punch card insulates all contacts 288 and 291 except those punched out of the card in accordance with a code. After appropriate punching of the card, the card may be said to carry certain intelligence in code. As the closing lever 101 is depressed, the upper, fingered, movable contact block 285 first moves mostly downward and as mutual contacts are made, movement continues downward and backward to give a wiping contact between each of the unit contacts 288 and 291 of each of the contact blocks where the insulative value of the punched card has been selectively destroyed in certain small areas. By the manner of motion and suspension of the moving contact block 285 clear and sharp electrical contacts are assured.

*The electrical circuits*

The invention is shown and described herein in conjunction with two principal modifications, a manual modification and a punched card or automatic modification, each of which are similar in principle but varied in some of the detail. The only changes are in the control box 94, which changes are electrical, primarily.

Figure 16:
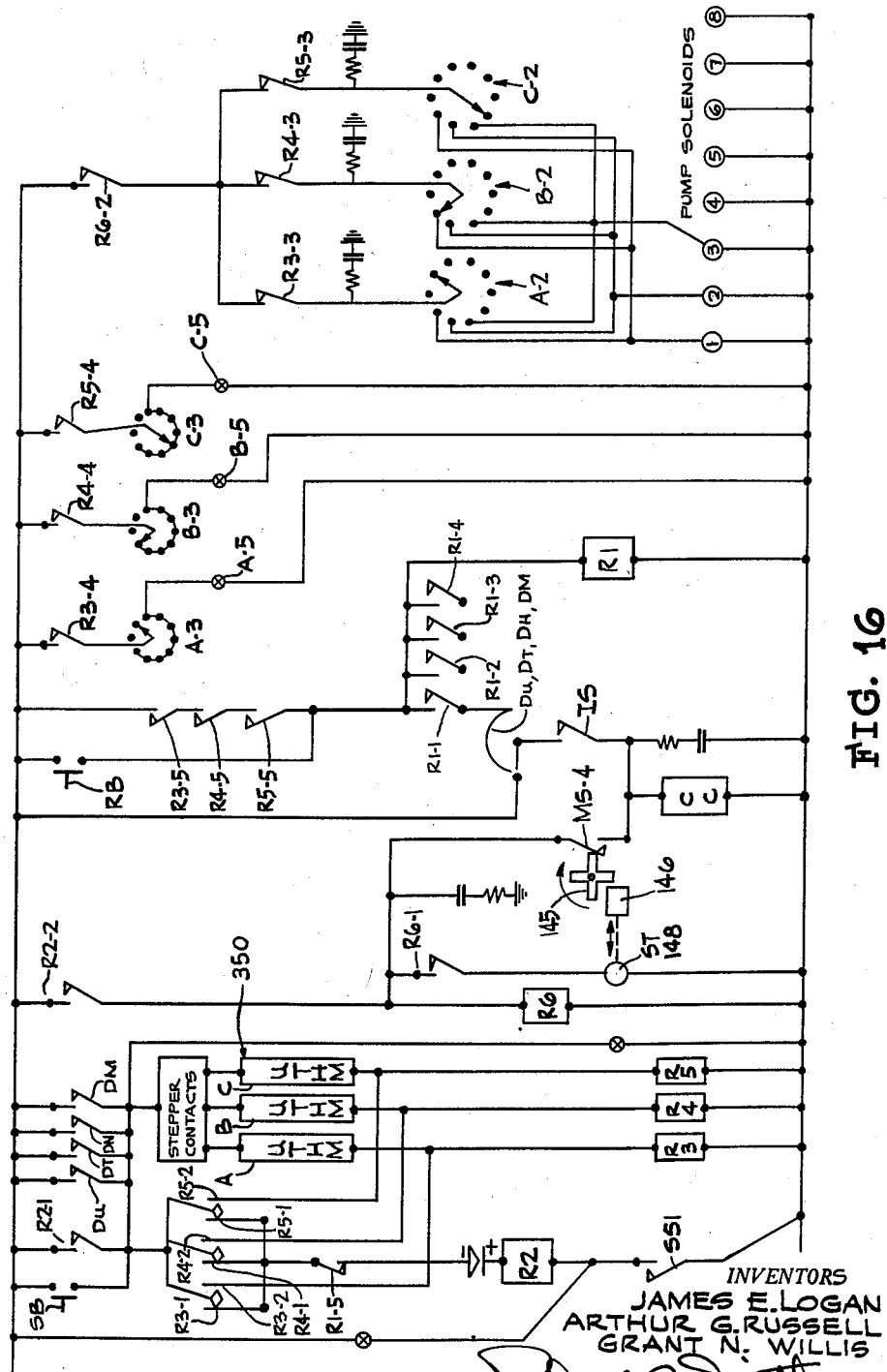
Figure 16 is a schematic electrical diagram of the manual modification of the invention using manual or dial means of setting paint formulative intelligence.
Figure 17:
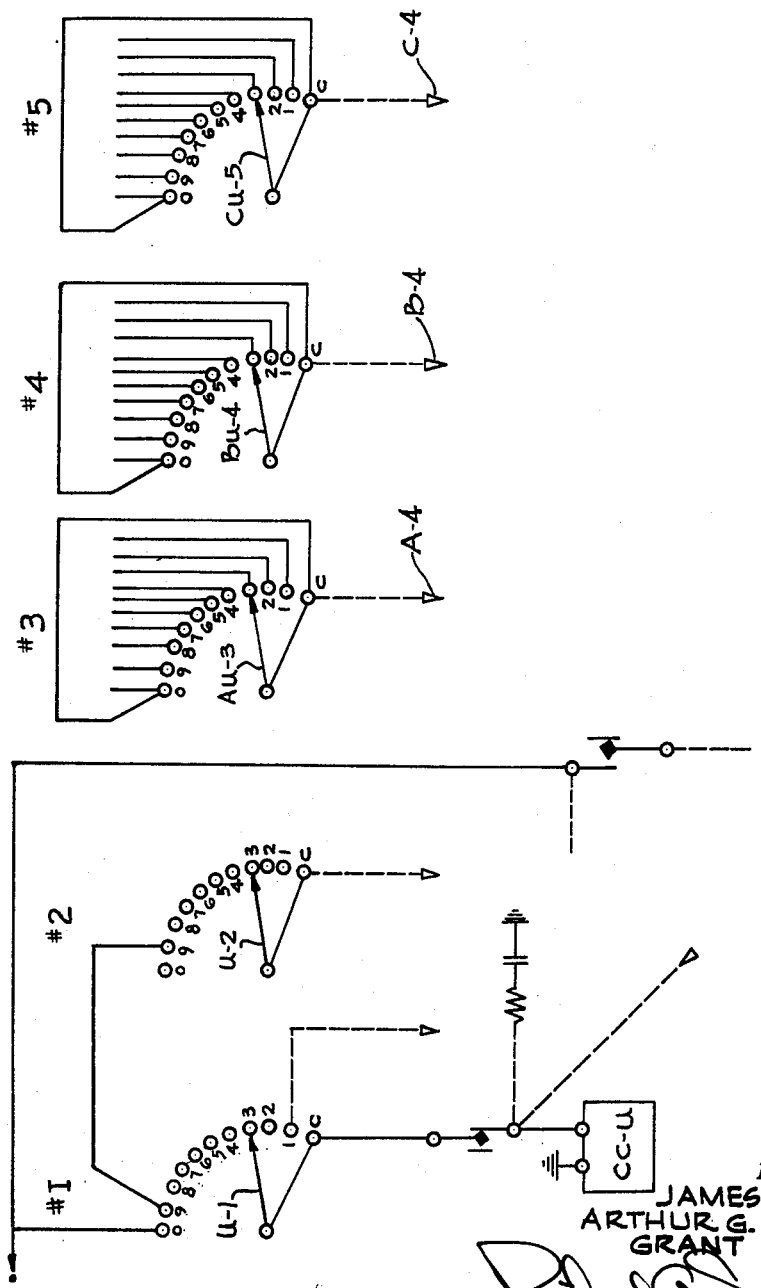
Figure 17 is a schematic electrical diagram of five banks of units stepping switch counting unit similar to other decimal units in the overall electrical counting system.

Attention is first directed to the manual modification as shown in the electrical schematic diagram of Figure 16 and the stepping switch schematic of Figure 17 which is common to both modifications.

The schematic drawing shown in Figure 16 illustrates a circuit which will count and deliver 9,999 parts of any one or all of three pre-selected colors from the eight colors available in the machine chosen to illustrate the invention. Obviously, the number of digits to be counted can be increased by the step of increasing the number of digit counting units. The digit counting units may be either of electromechanical nature (stepping switches) as shown or electronic counters as are commercially available in unit form. The number of digital counting units corresponds generally with the number of digits to be represented in the final number count. This group may be increased, also, as the number of operating pumps to give simultaneous delivery is increased. It is believed the means of increasing the number of variables will be apparent in the light of the following exposition.

Referring to Figure 16 a set of 3 colorant selector dials A2, B2 and C2 have eight pump contacts and a null point each. The machine operator may manually select any one of the contacts electrically connected with any one of the colorant storage pumps to deliver colorant to the central filling plate point 39. In the schematic of Figure 16 three liquids or liquid colorants may be delivered to the filling point at one time. The number of colorants to be delivered is only limited by the number of completed control units built into the dispensing unit. Setting of the colorant selector dials A2, B2 and C2 may operate, for illustrative purposes, pump solenoids and pumps 1, 5 and 7, for example. This is done by turning the A2 dial to pump 1 contact, the B2 dial to pump 5 contact and the C2 dial to pump 7 contact. These contacts through the pump selector dials, closed contacts R3–3, R4–3 and R5–3 of relays R3, R4 and R5, and closed contact of time delay relay R6 at the proper time energize selected pump solenoids which, when the circuit is broken de-energize and arrest rotation of the same pump drive shafts corresponding to pumps selected among the numbers 1 through 8. These pump shafts 197 are driven by the same chain 130 which drives the pulse generator and timer wheel 145 and which rotates all the units including the pumps and the timer wheel 145 at the same r.p.m.

Dials illustrated and identified as A3, B3 and C3 each represent four ten contact dials each of which are digital counting control groups and are manually settable to read upon any number from 0 to 9,999.

In the manual modification, A3 dial, as shown, represents a bank of four dials in horizontal row arrangement. B3 represents a similar row of four dials immediately below these and C3 the third row of four dials. These replace the card reader on the face of instrument panel 95 of control box 94. In our explanation of the circuits; A, B and C have been chosen to identify and represent distinct circuits which operate to control which specific ones of the eight pumps will be operated at any one time alone or in combination of three or less. Assume, for illustrative purpose, that 1,234 units of liquid base paint component or colorant were to be pumped from pump 1; 5,678 units from pump 5 and 9012 units from pump 7. First A2 dial is set at 1, B2 dial at 5, and C2 dial at 7. Thus, A-circuit control pump 1 solenoid, B-circuit controls pump 5 solenoid and C-circuit controls pump 7 solenoid. The four digital dials corresponding to M (thousands), H (hundreds), T (tens) and U (units) in each row of dials are appropriately set; namely, A3 dials to 1,234; B3 dials to 5,678 and C3 dials to 9012.

Individual contacts of the third (A), fourth (B) and fifth (C) banks of the stepping switches (shown for units in Figure 17) through units, tens, hundreds and thousands (units schematic shown is repeated for tens, hundreds, and thousands for B and C circuits) stepping switches provide correlation between the pumps (through their control solenoids) to be activated through the A, B and C circuits as well as the number of units of volume of liquid to be metered out and counted through each of the three circuits A, B and C.

Setting of the digital control dials in rows A3, B3 and C3 and pump selector dials A2, B2 and C2 conditions the essential circuits for manual operation. A receiving container is placed under the nozzle plate 39 and microswitch MS1 contact is made. Control panel lights in the circuitry show the power to be on driving the motor sprocket 117 and chain 130. A 24 volt D.C. circuit taken off the 115 volt line is activated through a suitable rectifier. These essential conditions have been generally indicated by open switch SS–1, which when met, in effect, closes SS–1.

Having satisfied pre-requisites to operation in setting pump selector dials and digital dials and met the safety conditions imposed, starter button SB is momentarily closed. The first relay, starter relay R2, is energized and its contacts R2–1 and R2–2 are closed. The off-normal contacts of the stepping switches representing the digital counting circuit DU, DT, DH and DM close, putting all wiping switches (U–1, U–2, AU–3, BU–4, CU–5 illustratively) in all banks or decks in contact with their first operating contact position in all activated circuits A, B and C.

Closed contact R2–2 activates time delay relay R6, which closes contact R6–1, activating pulse timer and counter wheel 145 solenoid ST, by freeing pulse generator and counter wheel 145 to rotate through its friction clutch 139 and through the chain drive 130 upon withdrawal of stop pawl 146 by solenoid 148.

Closing of contact R6–2 and normally closed contacts R3–3, R4–3 and R5–3 of de-energized relays R3, R4 and R5 activate pump control solenoids #1, #5 and #7 (214) which are practically identical with solenoid ST (148) and allow the so-activated pumps, in our illustrative case gear pumps 1, 5 and 7, to be driven through common drive chain 130, pump shaft sprockets 121, 125 and 127, respective, shafts 197 and shaft spring clutches 195.

As drive chain 130 drives the pulse generator and counter wheel 145, pulses are generated through deflection of microswitch MS–4 arm 160 by dimples 156, 157, 158 and 159. The pulses so generated energize coils corresponding to CC of the units stepping switch CC—U causing the wiper arms (in the various banks thereof) U–1, U–2, AU–3, BU–4 and CU–5 to advance one contact for each pulse thereafter generated. In effect, the pulses are counted by bank #2 of each digital stepping switch in turn and after each sequence of ten pulses or multiples thereof. Wiping contact AU–3 of the third bank and its co-related and similar switch in the tens, hundreds and thousands stepping switches control circuit A and count the pulses as generated, which pulses in turn correspond to a standard liquid volumetric quantity delivery by pump 1 controlled by and in the general A circuit. The same pattern is followed through wiping switch BU–4 (4th bank-units), BT–4, BH–4, and BM–4 (circuits B—tens, hundreds and thousands, 4th bank) which stepping switches and wiping switches correspond to those of Figure 17 but are not shown as the others are essential duplications.

Thus briefly, each pulse generated by microswitch MS–4 is accounted for serially by tens in the stepping switches and delivers one-quarter of the full rotational displacement of the pump controlling a particular liquid colorant as each pump activated is rotated by the common chain 130.

As the wiper arm U–1 of the units group shown passes over the tenth contact 0 a pulse is carried forward to the coil of the stepping switch activating the solenoid of the tens stepping switch and which is identical to the CC—U coil shown in Figure 17 and CC coil in Figure 16. All the wiper arms on the common shaft of the tens stepping switch advance one contact. As the wiper arms in the tens stepping switch advance past the tenth contact, the coil corresponding to CC—H (not shown) in the hundreds stepping switch through contacts in bank two thereof, is activated and its wiping arms on a common shaft are moved forward in the decimal sequence now becoming clear. Similarly, after 999 pulses, the thousands coil (CC—M, not shown) of the stepping switch of the thousands digit advances one contact by movement of its common shaft and wiper arms through one contact. Advance of the units to tens, tens to hundreds, and hundreds to thousands is controlled by series contacts through the second bank of the digital stepping switches, through wiper arms corresponding to U–2. The above description covers the general action and arrangement of the counting stepper switches (the units of which are illustrated in Figure 17) which receive and indicate each pulse generated and each quantum of paint delivered from pumps under control of separated circuits A, B and C.

Returning specifically to the dial system set-up, circuit A set up through pump selector dial A2, activating pump solenoid and pump 1, circuit B through pump selector dial B2 activating pump 5 and circuit C through pump selector dial C2 activating pump 7 now operate as their corresponding stop solenoids S (S1, S5 and S7) have been activated, and their respective clutches 195 engage pump shafts 197 driven by the single drive chain 130 and individual sprockets 121, 125 and 127.

Counting through the three stepping switch assemblies for each A, B and C circuit continues, as described generally above, advancing through the decimal system as pulses are sequentially caused through stepper coils CC of the wiper arm contacts until the A circuit corresponding to the count set on dials corresponding to A3, B3 and C3 have been delivered through A circuit. At the moment when stepping switch wiper arm AU–3 of the third bank of the units stepping switch contacts the last digit, namely contact 4 (the last digit of the required number 1,234) the "A" control circuit is satisfied through the third bank of each of the digital stepping switches of the A circuit, the wiper contact in the third bank of each having advanced to contacts, which, as an aid to mental visualization, may be identified as follows: AM3–1, AH3–2, AT3–3 and AU3–4, the last of which is illustrated in Figure 17. In other words, the A digital control stepping switches (those in circuit A) corresponding with the digit; tens, hundreds, etc.; in the third bank of each have wiping switch arms advanced to single pre-selected contacts equivalent to the count set up by our illustration, namely 1,234 pulses or units of volume of colorant.

As the pre-set conditions in circuit A have been met, the circuit flashes back through the dial contacts of A3 shown in the drawing as manual dial contacts 350–A which energizes through the 24 volt circuit the relay R3.

This having happened, now energized relay R3 opens normally closed contact R3–3 and the thus opened pump circuit de-energized the solenoid controlling pump 1. Pump 1 ceases to deliver. Contacts R3–4 and R3–5 close as does R3–2. Contact R3–1 opens. Pump circuits "B" and "C" continue to operate as before in accordance with the pulses generated by pulse generator and counter wheel 145 which continues in operation.

The continuing pulses are counted by the "B" and "C" circuits, and as the stepping switches in the "B" circuit, through wiping arm switch BU-4 in bank #4 of the units stepping switch passes the 8th contact (after 5677 has been counted) the "B" circuit is satisfied through its stepping switches which activate relay R4. R4-1 contact switches to R4-2 position, R4-3 contact opens, de-energizing the pump solenoid controlling pump #5 and arresting liquid colorant delivery from that pump. Contact R4-4 closes along with R4-5 and the receiving can has had the required 5678 units of volume of colorant delivered.

In a similar fashion, pulses continue through the "C" control circuit until 9012 pulses have been counted through the stepping switches, U, T, H and M making contacts through contacts of dials C3 and relay R-5 circuit is activated. Closing of relay R5 completes all of the requirements set up by the manual dials. A homing circuit is ready to be set in operation. Return of the electrical equipment to normal positions, ready for the next operation or use of the paint manufacturing machine of this invention is initiated by closing of relay R5 contact R5-5. Contacts R3-5, R4-5 and R5-5 closed and in series energizes homing relay R1, closing contacts R1-1, R1-2, R1-3 and R1-4 of the first bank of the stepping switch. Current through the first bank of the stepping switches leads to pulse current in all stepping switch coils CC in all three circuits A, B and C, which pulses turn all the wiping arm switches thereof to their standard off-normal positions, opening contacts DU, DT, DH and DM of each group. The power source or current essential to this return passes through closed contacts R3-2, R4-2 and R5-2.

Closing of contacts of homing relay R1 opens normally closed contact R1-5 de-energizing relay R2 opening its contacts R2-1 and R2-2. Opening R2-2 contact de-energizes time delay relay R6 opening contact R6-1, de-energizing solenoid ST which causes the stop pawl 146 thereof to engage a tooth such as 152 of the pulse generator and counting wheel 145. Relays R3, R4 and R5 are de-energized, contacts R3-1, R4-1, and R5-1 are remade by opening of contact R2-1 and off normal contacts DU, DT, DH and DM of the digital stepping switches are returned to open positions. De-energized relays R3, R4 and R5 open contacts R3-5, R4-5 and R5-5 (normal positions) open R3-4, R4-4 and R5-4 and close R3-3, R4-3 and R5-3. De-energized relay R6 opens contact R6-2. Opening of contacts R3-5, R4-5 and R5-5 de-energizes homing relay R1 opening the homing relay contacts R1-1, R1-2, R1-3 and R1-4.

All relays and the contacts thereof have now been returned to their starting conditions and the cycle may be repeated by merely pressing starter button SB. If some error is noted, reset button RB; in parallel with contacts R3-3, R4-3 and R5-3; will return the electrical system to starting condition again through activation of the homing relay R1. The dials may be reset to a new requirement of a particular number of units of volume of selected pumps in each of the three separate circuits A, B and C.

From the above it is seen how circuits A, B and C were manually set to activate pumps #1, #5 and #7 to deliver 1234 units of colorant from pump #1 through the A circuit, 5678 units of a different liquid from pump #5 through B circuit and 9012 units of volume of a third colorant from pump #7 through the third circuit, C.

The device described herein is available in both a manual and punched card modification wherein the control boxes 94 are interchangeable through a convenient multiple contact disconnecting plug (13 contact Jones plug). In each case power is derived from a 115 volt A.C. source controlled with an on-off switch. A 24 volt D.C. control circuit is taken from the main power source through a rectifier. The motor drive is 115 volt directly from the power source.

The punched card modification of the invention differs from the manual operating machine only in the construction and content of the control box 94 and control panel 95.

Essentially there is relatively small difference, even in the circuits and construction of the control box in the two modifications illustrated. In the manual model just described, the one set of three pump selector dials A2, B2 and C2 and the three rows of four dials per row identified as A3, B3 and C3 are replaced by the previously described card reader unit. A brief review of the punched card description and the card reader set out and described previously may be helpful. To refresh the recollection the punched card of Figure 12 in the main is an insulator adapted to be carried between movable upper spring contact block 285 and lower fixed contact block 290 of the card reader 100. The card provides potential contact through it in any one of four columned areas, each column of which is in duplicate arrangement of others under an index hole. Each column area is an exact replica as to potential contacts of the actual contacts in the upper card reader spring contact block 285 and lower fixed contact block 290. There are, in total, ten columns of contacts of 15 rows. The rows of contacts are arranged in three groups of four. The three groups, as they are related to circuit controls in circuits A, B and C are each identical in arrangement, the first row of each of the three groups of four corresponding to thousands digits (M), the second row hundreds digits (H), the third row tens digits (T) and the last row to units (U). The last three rows are adapted to govern the three groups A, B and C and are identified as A1, B1 and C1 relating to the A, B and C circuits of the over-all electrical system. Holes correctly punched in the cards (through "c" and the number in each row) will operate selected pumps within each of the three general circuits A, B and C. Other holes punched in the appropriate digits rows and columns will determine the pulses to be counted and the corresponding quantum of color from each selected pump. With this minor review the electrical system will be followed in the punched card modification, referring from time to time to Figures 17, 18 and 19.

As previously noted, the card is primarily divided into four master vertical columns, each vertically aligned below a large master index hole, e.g., 252, at the top of the card. If the card, when positioned in the card reader 100 for delivery of colorant, is not properly aligned, the index hole is not in position and the contacts 335 and 336 of microswitch MS-3 cannot be made which are essential to initial energizing of circuits needed for dispenser operation. Each of the sets of vertical columns under "S," "Q," "G" and "5G" are designed to operate the unit machine independently of one another, and are placed in a pre-selected position by means of a horizontal rack and pinion shifting arrangement in conjunction with the card reader mechanism as has been described. The first vertical column is reserved for special formulations and special uses, but in essence, each column has identical arrangement. The second column dispenses units to make a full quart of product, the third one gallon and the fourth five gallons. As these are volumes of goods most standardly demanded in general paint sales, they are chosen. Obviously, the machine may be scaled up or down to fit the requirements of a particular end use.

For purposes of specific illustration, assume a punched card (as in Figure 12) is prepared under the one gallon index hole "G." Under that index hole we punch the 1 area in the 1st row of the A block corresponding to 1000's (M). Punch the 2 area in the 2nd row under 100's (H), the 3 area in the 3rd row under tens (T) and the 4 area in the 4th row under units (U). Similarly in the rows in block B are punched 5 area in M, 6 area in H, 7 area in T and 8 area in U. These contact potentials control a pump to be selected to deliver under B circuit. Likewise, in block C, M row is punched out in area 9, the zero in row H, the 1 in row T and 2 in row U. Under rows A1, B1 and C1 the C (or C0) and pumps 1, 5 and 7 are selected to deliver corresponding liquid colorant.

The punched card is placed in the card reader 100 and positioned between the card reader contact blocks by means of knob 102 being turned to "G" position. The card reader lever 101 is closed and the contacts called for by the punched card reader in the card reader are made. Microswitches MS–2 and MS–3 make contact. A container is placed in receiving position in the machine and microswitch MS–1 is energized. Appropriate indicator lights 110, 111 and 112, in series with these contacts light indicating operating order has been established. A circuit is completed except for starter button SB to be depressed.

Circuits to be completed through the card reader and punched card are practically the same from this point through to the completion of the dispensing cycle of the machine as in the manual circuits.

Figure 18:
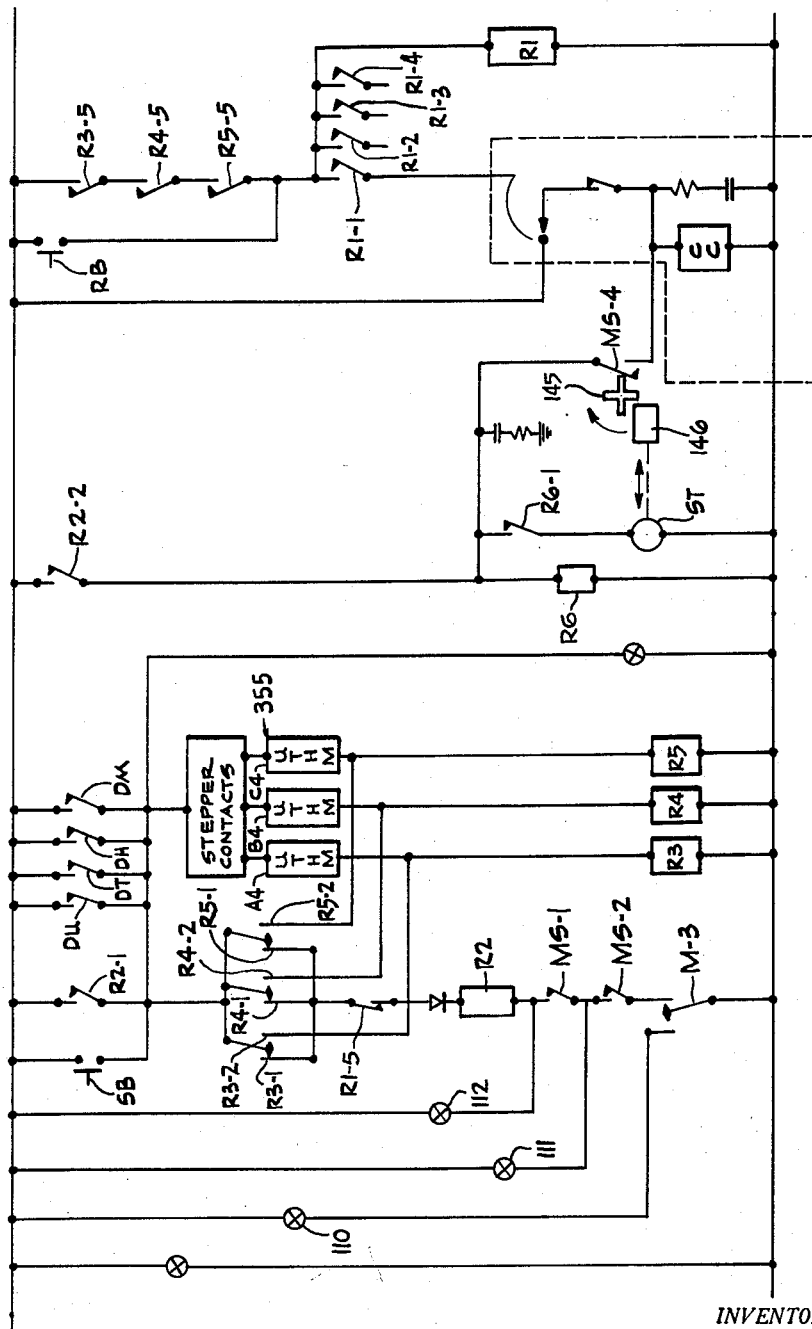
Figure 18 is a further schematic diagram indicating the left-hand area of the electrical diagram of the punch card modification of the invention.

Referring to Figure 18, starting relay R2 is energized by momentary closure of starter button SB. Relay R2 is energized and its contacts R2–1 and R2–2 close along with off-normal stepping switch contacts DU, DT, DH and DM of the digital counters. This places the three sets of four stepping switches controlling pulse counts in electrical operating condition to count pulses as generated.

Closed relay R2–2 closes time delay relay R6, whose delayed circuit energizes solenoid ST withdrawing stop pawl 146 holding the pulse generating and counting wheel 145 from rotation. Rotation of pulse generator and timer wheel 145 generates a pulse by means of and through microswitch MS–4 which pulse activates coils corresponding to the one illustrated as CC and CC—U, the pulse moving stepper contacts of circuits A, B and C through the units, tens, hundreds and thousands stepping switches, each digital stepping switch is similar to that schematically shown in Figure 17.

Counting of the pulses through the various digital decimal progressions of the stepping switches proceeds in the same manner as described in the manual modification of the invention, the third bank of each of the units, tens, hundreds, etc., controlling through A4 the A circuit, B4 the B circuit and C4 the C circuit.

Figure 17 details the five banks of one operating stepping switch and the function of the various banks. Each digit requires a corresponding stepping switch assembly. One each for units, tens, hundreds and thousands (milli). The wiping arms in each 5 deck stepping switch operate off the same shaft and are advanced over the same path by the same stepping switch solenoid which are similar to illustrated coils CC and CC—U which are energized by each pulse received direct or by transfer from a previous decimal count. The first bank (Figure 17) serves as a reset circuit to bring all digital stepping switches back to off-normal and standard position. The second bank may be referred to as a decimal digital advance bank, for as each time the units stepping switch wiper arm passes the ninth contact a circuit is completed through the tens digit stepping switch advancing the wiping arm one contact in the tens stepping switch. Likewise, as the tens stepping switch advances past its ninth contact, the hundreds stepping switch moves over one contact. This series can be repeated for the number of digits one wishes to build into the paint manufacturing unit of this invention.

The third, fourth and fifth bank of each stepping switch are independent carrying circuits A, B and C and count the pulses which correspond to the three pumps in the general circuits A, B and C. As previously indicated, circuits A, B and C control any one of the eight pumps of the illustrated machine through the corresponding solenoid and stop pawl. Each individual contact of the third, fourth and fifth bank is wired to the corresponding decimal digital contact in the lower block 290 of contacts in card reader 100. Illustratively, the third bank, corresponding to the A circuit and pump 1 in our illustrative case has a lead wire from the 1 contact of the third bank to the one position of digitals row A in the card reader. The fourth bank, corresponding to circuit B and particularly pump 5, has electrical connection from the sixth unit contact of bank 4, to the sixth unit position in digitals row B of the card reader. The fifth bank, corresponding to general circuit C (pump 7) has a unit connection, illustratively from the single contact 7 of bank #5 to the 7 unit contact of card reader digitals row C.

The individual pumps which are selected for operation through A, B and C circuits are governed by the holes punched in the punched card, Figure 12, under rows marked A1, B1 and C1. Holes being punched through, in our illustrative case in A1—"C" and 1 position, B1—"C" and 5 position and in C1 in the "C" and 7 position. Contacts made through this area in card reader 100 energize solenoids S illustrated in Figures 7 and 8 as 214, and the pumps corresponding thereto start to deliver liquids from the storage containers 31—38. Driven by the same chain 130 as is the pulse generator and counter wheel 145 the pumps deliver a quantum of liquid colorant for each pulse generated.

Pulse generation, stepping switch action and liquid colorant delivery continue until the pump in the A circuit (shown in Figure 18 as card reader selector contacts U, T, H and M—A4 pump 1) has delivered the 1234 parts of selected colorant. At this moment, circuit A is completed through the punched card reader 100 shown generally as 355 in Figure 18 and the holes punched in the blocks under index hole "G" in the A block through 1 in the thousands row, 2 in the hundreds row, 3 in the tens row and 1 in the units row. The count in the A circuit is completed upon circuit completion through U, T, H and M section of the card and the card reader which energized relay R3.

Figure 19:
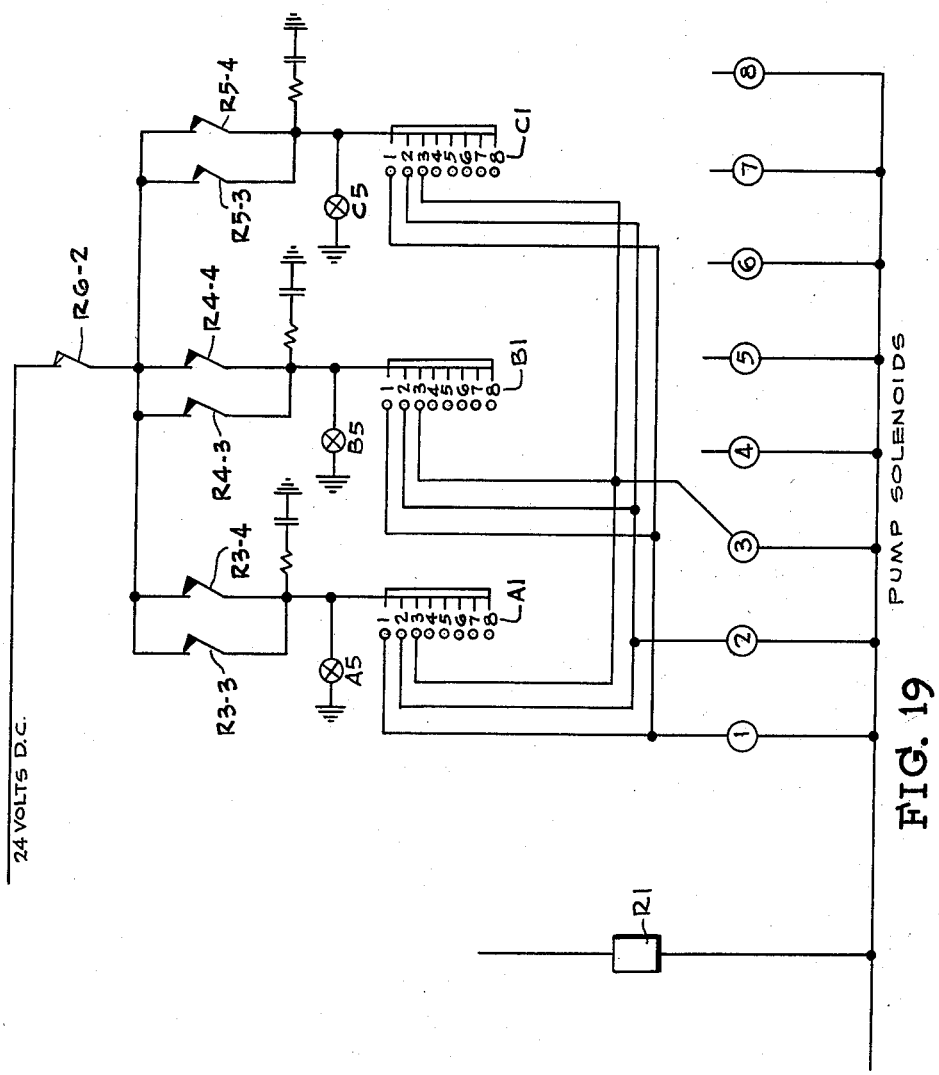
Figure 19 is the correlated right-hand area of the schematic electrical diagram of the punch card modification of the invention.

Energizing of relay R3 opens its contacts R3–3 and R3–4, closes contact R3–5 and shifts contact R3–1 to R3–2 position. Opening of R3–3 and R3–4 opens the pump control circuit A through the card A1 rows (Figure 19). The solenoid controlling pump 1 operation is de-energized and stop pawl 212 falls into position in count wheel 210 stopping liquid colorant delivery.

Pulse generation and counting continues through general circuits B and C. Soon the punched card circuit through the card reader selector contacts in B4 (355) is satisfied through the digital stepping switches controlling the U, T, H and M counts in circuit B, and relay R4 is energized through the card reader block corresponding to the B circuit of the punched card. Relay R4 contact R4–5 is closed, R4–3 and R4–4 opened and R4–1 switched to position R4–2. Opening of R4–3 and R4–4 de-energizes the pump solenoid shown as 214 corresponding to pump 5 (similar in function to solenoid ST). Pump 5 is then held from operation against its clutch 195 by a stop pawl similar to 212 preventing rotation of pump drive shaft 190.

In a similar manner, circuit C remains operative and the pulse generator and counter wheel 145 continues to pass pulses through general circuit C. As the 9012 pulse passes through circuit C the last circuit through the digital block C of the punched card is completed through card reader circuit C4. Relay R5 is energized shifting its control R5–1 to position R5–2, closing normally open contact R5–5 and opening contacts R5–3 and R5–4. The latter open contacts arrest delivery of pump 7 in the C circuit through the hole in C and 7 in the C1 row of the punched card. This is done through release of the solenoid (such as 214) which controls the stop pawl (such as 212) holding pump 7 from further liquid delivery.

Simultaneously with the closing of contact R5–5 a new circuit is completed through R3–5, R4–5 and R5–5 which closed contacts energize homing relay R1 whose contacts R1–1, R1–2, R1–3 and R1–4 close. (The same action may be obtained in case of need or error by closing the reset button RB.) The closed homing relay contacts complete circuits through each of the stepping switch digital counting units in their first bank which returns the wiping arms of all the stepping switches to the "C" or off-normal position and off-normal springs DU, DT, DH and DM in each of the digital groups are opened. Contact R1–5 is opened as the other contacts of homing relay R1 are closed. The brake in circuit de-energizes relay R2, opening its contacts R2–2 and R2–1. Breaking of the circuit controlled by contact R2–2 deenergizes time delay R6 and opens its contacts R6–1. The pulse generator wheel 145 is stopped by its stop pawl 146 falling into its position arresting rotation of timing wheel 145. Microswitch MS–4 discontinues its pulse generation through the counting circuits coils CC—U, etc. As off-normal springs are opened, relays R3, R4 and R5 are de-energized and the contacts associated with these relays return to their original or normal non-operating positions, ready for re-use of the dispensing machine. Opening of contacts R3–5, R4–5 and R5–5 de-energize homing relay R1 open its contacts R1–1 through R1–4 and all circuity is returned to pre-operating conditions. The punched card may then be removed and a new one substituted, or the same color in the same quantity may be re-dispensed, if desired, by merely pushing the starter button SB.

The foregoing discussion is believed to clarify the operation of the counting circuits and pump control circuits in both the manual and punched card operation modifications. It is not intended that the color dispensing machine be limited to the two modifications in their relatively simple form as shown. It is within the scope of the invention to expand the operation to a greater number of pumps which may be selectively operated by punched card means controlling half a dozen or more simultaneous deliveries of fluids. Thus, while the apparatus is illustrated in a simple form, an automated factory is within the contemplation of the invention by addition of similar units to those as described above.

Having thus described our invention, what we claim is:

1. A liquid formulating machine adapted to receive and act upon coded numerical intelligence fed into said machine which comprises in combination a plurality of liquid reservoirs and individual positive displacement pumps in fixed position in said machine in dispensing association therewith, separate and individual liquid conconduits from each of said pumps to a central dispensing point, a rotational power source, an electrical pulse source generating pulses in timed relation to said power source rotation, a plurality of pulse receiving and counting means, numerical intelligence receiving means adapted to be movably fixed in a selected stationary location to control and limit the liquid dispensing activity of said machine to pre-selected ones of said pumps and to pre-determined unit volumes delivered to said central dispensing point from said pre-selected pumps, said unit volumes corresponding to the pulse counts received and counted by said pulse receiving and counting means in accordance with the coded numerical intelligence set up in and received by said intelligence receiving means.

2. A liquid formulating machine adapted to receive and act upon coded numerical intelligence fed into said machine which comprises in combination a plurality of liquid reservoirs and individual positive displacement pumps in fixed position in said machine in dispensing association therewith, separate and individual liquid conduits from each of said pumps to a central dispensing point, a single rotational power source adapted to drive selected ones of said pumps pre-selected in accordance with the coded intelligence, an electrical pulse source generating pulses in timed relation to the unit volume delivery of the selected ones of said pumps, a plurality of pulse receiving and counting means, numerical intelligence receiving means in electrical association with said counting means adapted to be movably fixed in a selected stationary location to control and limit the liquid dispensing activity of said machine to pre-selected ones of said pumps and to pre-determined unit volumes delivered to said central dispensing point from said pre-selected pumps corresponding to the pulse counts received and counted by said pulse receiving and counting means in accordance with the coded numerical intelligence fed to said intelligence receiving means.

3. A liquid formulating machine adapted to receive and act upon coded numerical intelligence fed into said machine which comprises in combination a plurality of liquid reservoirs and individual positive displacement pumps in fixed position in said machine in dispensing association therewith, separate and individual liquid conduits from each of said pumps to a central dispensing point, a single rotational power source adapted to drive pre-selected ones of said pumps, an electrical pulse source generating pulses in timed relation to the unit volume delivery of the selected ones of said pumps, a plurality of pulse receiving and counting means, numerical intelligence receiving dial means in electrical association with said counting means adapted to be movably fixed in a selected stationary location to control and limit the liquid dispensing activity of said machine to pre-selected ones of said pumps and to pre-determined unit volumes delivered to said central dispensing point from said pre-selected pumps corresponding to the pulse counts received and counted by said pulse receiving and counting means in accordance with the dial settings corresponding to the numerical intelligence received.

4. A liquid paint formulating machine adapted to receive and act upon numerical intelligence fed into said machine which comprises in combination a plurality of liquid reservoirs and individual positive displacement pumps in fixed position in said machine in dispensing associaton therewith, separate and individual liquid conduits from each of said pumps to a central dispensing point, a single rotational power source adapted to drive pre-selected ones of said pumps, an electrical pulse source generating pulses in timed relation to the unit volume delivery of the pre-selected ones of said pumps, a plurality of pulse receiving and counting means, numerical intelligence receiving punched card means in electrical association with said counting means, said numerical intelligence entered upon said card by an ordered destruction of minor areas of said card, said card and counting means combination adapted to be movably fixed in a selected stationary location to control and limit the liquid dispensing activity of said machine to pre-selected ones of said pumps and to pre-determined volumes delivered to said central dispensing point from said pre-selected pumps corresponding to the pulse counts received and counted by said pulse receiving and counting means in accordance with the numerical intelligence entered upon said punched card intelligence receiving means.

5. A liquid formulating machine adapted to receive and act upon coded numerical intelligence fed into said machine which comprises in combination a plurality of liquid reservoirs and individual positive displacement pumps in fixed position in said machine in dispensing association therewith, separate and individual liquid conduits from each of said pumps to a central dispensing point, a single rotational power source adapted to drive agitators in all of said liquid reservoirs and to drive pre-selected ones of said pumps, an electrical pulse source generating pulses in timed relation to the unit volume delivery of operating ones of said pumps, a plurality of pulse receiving and counting means corresponding in number to the number of groups pre-selected to be operative in said machine, numerical intelligence receiving means in electrical association with said counting means adapted to be movably fixed in a selected stationary location to control and limit the liquid dispensing activity of said machine to pre-selected ones of said pumps and to pre-determined volumes delivered to said central dispensing point from said pre-selected pumps corresponding to the pulse counts received and counted by said pulse receiving and counting means in accordance with the numerical intelligence set up to be received by said intelligence receiving means.

6. A liquid paint formulating machine adapted to receive and act upon numerical intelligence fed into said machine which comprises in combination a plurality of liquid reservoirs and individual positive displacement pumps in fixed position in said machine in dispensing association therewith, separate and individual valve-free liquid conduits from each of said pumps to a central dispensing point terminating in downwardly depending dispensing orifices of a diameter such that the liquid dispensed ceases flow therefrom upon the removal of the forces exerted thereon by the pumps, a plurality of pulse receiving and counting means corresponding in number to the number of pumps selected to be operative in said machine, numerical intelligence receiving means in electrical association with said counting means adapted to be movably fixed in a selected stationary location to control and limit the liquid dispensing activity of said machine to pre-selected ones of said pumps and to pre-determined liquid volumes delivered to said central dispensing point from said pre-selected pumps, said volume corresponding to the pulse counts received and counted by said pulse receiving and counting means in accordance with the numerical intelligence set up to be received by said intelligence receiving means.

7. A color matching liquid paint formulating machine adapted to receive and act upon numerical coded intelligence fed into said machine which comprises in combination a plurality of liquid reservoirs and individual positive displacement gear pumps in fixed position in said machine in unit assembly and in dispensing association with one another arranged in order about a central dispensing point and removably set into a receiving table adapted to receive the pump drive shafts and the container agitator drive shafts of said units, separate and individual flexible liquid conduits from the egress port of each of said pumps to said central dispensing point, a single rotational power source adapted to drive pre-selected ones of said pump drive shafts through a positive endless driving means and clutch means between said positive drive means and said pump drive shafts, solenoid means to control operation of pre-selected ones of said pumps, an electrical pulse source generating pulses in timed relation to the angular rotation of said power source, a plurality of electrically operated pulse receiving and counting means adapted to be movably fixed in a selected stationary location to receive and interpret the intelligence coded therein through the order of electrical contacts made through said intelligence receiving means, said contacts completing circuits adapted to control and limit the liquid dispensing activity of said machine to pre-selected ones of said pumps and to predetermined volumes delivered to said central dispensing point from said pre-selected pumps corresponding to the pulse counts received and counted through said intelligence receiving means by and in electrical association with said pulse receiving and counting means in accordance with the numerical intelligence entered in said intelligence receiving means.

8. A color matching liquid paint formulating machine adapted to receive and act upon numerical punched card coded intelligence fed into said machine which comprises in combination a plurality of liquid reservoirs and individual positive displacement gear pumps in fixed position in said machine, in unit assembly and in dispensing association with one another arranged in order about a central dispensing point and removably set into a receiving table adapted to receive the pump drive shafts and the container agitator drive shafts of said units, separate and individual flexible liquid conduits from the egress port of each of said pumps to said central dispensing point, a single rotational power source adapted to drive pre-selected ones of said pump drive shafts through a positive endless driving means and clutch means between said positive drive means and said pump drive shafts, solenoid means to control operation of pre-selected ones of said pumps, an electrical pulse source generating pulses in timed relation to the angular rotation of said power source, a plurality of electrically operated pulse receiving and counting means, a punched card reader adapted to be movably fixed in a selected stationary location to receive a punched card and interpret the intelligence coded therein through the order of electrical contacts made through the areas thereof so destroyed, said contact completing circuits adapted to control and limit the liquid dispensing activity of said machine to pre-selected ones of said pumps and to pre-determined volumes delivered to said central dispensing point from said pre-selected pumps corresponding to the pulse counts received and counted through said card reader contacts by and in electrical association with said pulse receiving and counting means in accordance with the numerical intelligence entered through the punched card in place in the card reader.

References Cited in the file of this patent
UNITED STATES PATENTS

| | | |
|---|---|---|
| 1,219,205 | Wellman | Mar. 13, 1917 |
| 2,431,058 | Manning | Nov. 18, 1947 |
| 2,787,402 | Stiner | Apr. 2, 1957 |

UNITED STATES PATENT OFFICE

CERTIFICATE OF CORRECTION

February 2, 1960

Patent No. 2,923,438

James E. Logan et al.

It is hereby certified that error appears in the printed specification of the above numbered patent requiring correction and that the said Letters Patent should read as corrected below.

Column 2, line 38, for "of units" read -- of the units --; column 3, line 44, for "sprockets" read -- sprocket --; column 5, line 12, for "speed for" read -- speed of --; column 7, line 62, strike out "receipt of order", second occurrence; column 8, line 69, for "360" read -- 300 --; column 11, line 53, after the syllable "tive" strike out the comma; column 12, line 60, for "(those in circuit A))" read -- (those in circuit A) --; column 18, line 75, for "groups" read -- pumps --.

Signed and sealed this 25th day of October 1960.

(SEAL)
Attest:

KARL H. AXLINE

Attesting Officer

ROBERT C. WATSON
Commissioner of Patents